April 28, 1942.     A. M. WRIGHT     2,281,189
CATCHER ATTACHMENT FOR POWER HEDGE-TRIMMERS
Filed Aug. 12, 1938     2 Sheets-Sheet 1
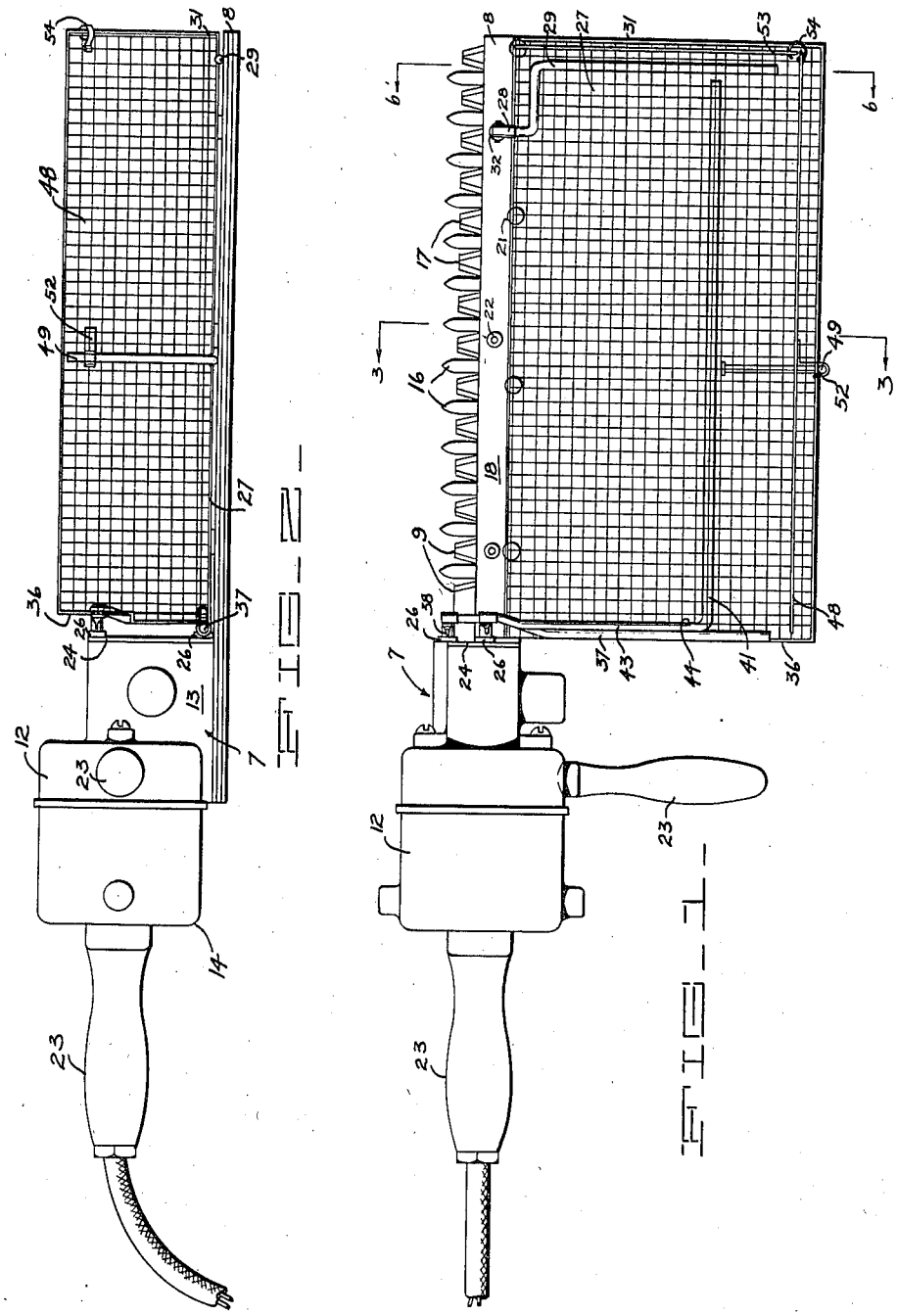
INVENTOR
Alfred M. Wright
BY
ATTORNEY April 28, 1942. A. M. WRIGHT 2,281,189
CATCHER ATTACHMENT FOR POWER HEDGE-TRIMMERS
Filed Aug. 12, 1938 2 Sheets-Sheet 2
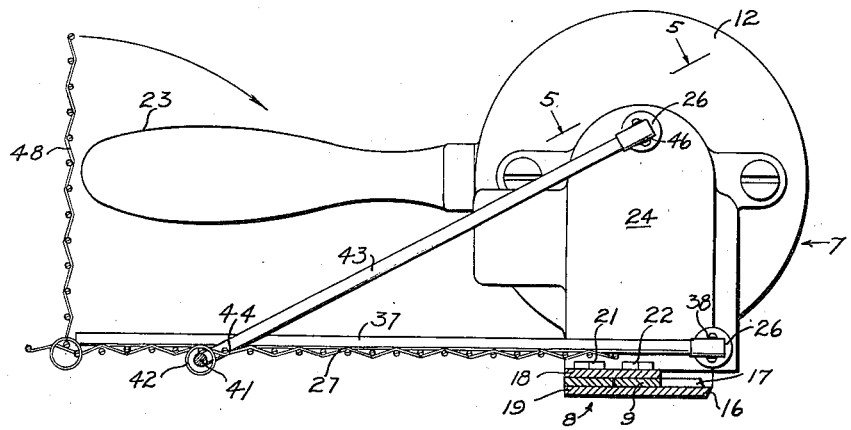
FIG_3_
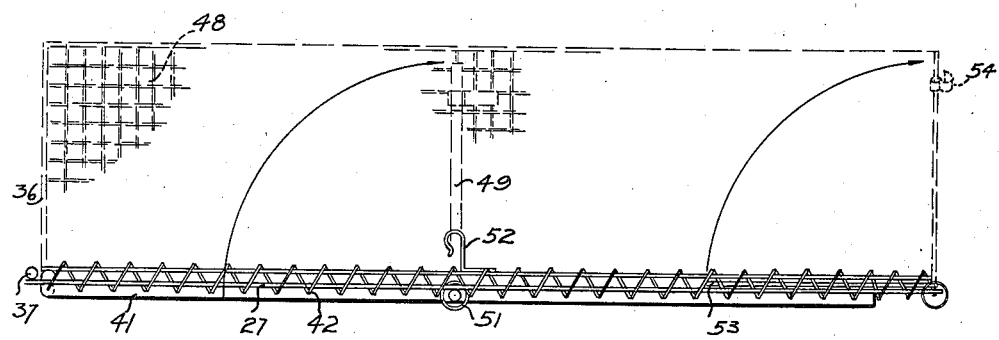
FIG_4_
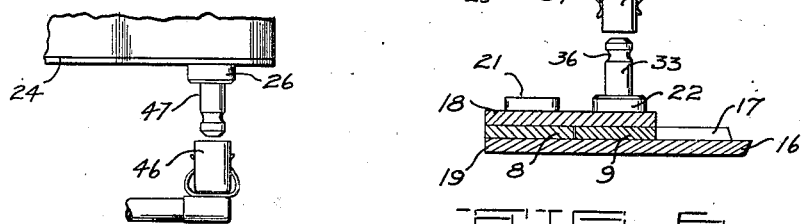
FIG_5_ FIG_6_
INVENTOR
Alfred M. Wright
BY
Joseph B. Gardner
ATTORNEY Patented Apr. 28, 1942

2,281,189

UNITED STATES PATENT OFFICE 2,281,189

CATCHER ATTACHMENT FOR POWER HEDGE-TRIMMERS

Alfred M. Wright, Oakland, Calif.

Application August 12, 1938, Serial No. 224,533

9 Claims. (Cl. 30—132)

The invention relates to an attachment arranged to be secured to a portable power-operated shrubbery-trimming or cutting device and designed to catch the cuttings during the trimming operation.

An object of the invention is to provide an attachment of the character described which is designed and arranged for positioning on and connection to the trimmer in such manner that without causing any interference with the effective use of the trimmer, the cuttings may be readily caught by the device whereby they will be prevented from depositing upon the trimmed shrubbery and causing the disarrangement of the latter when the operator subsequently attempts to remove the deposited cuttings therefrom.

Another object of the invention is to provide means of fastening the catcher device to the trimmer, which will permit quick attachment or detachment of the device to or from the trimmer without necessitating the removal or displacement of any of the trimmer parts or connections, and without danger of the device becoming accidentally detached while in use.

A further object of the invention is to form the catcher device in such manner that when detached and removed from the trimmer, it may be folded in exceedingly compact form.

A still further object of the invention is to provide an attachment of the character described, in which the various parts will cooperate to strengthen and reenforce the entire structure, thereby providing a light as well as a durable and inexpensive article.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a plan view of the attachment of my invention operatively connected to a power-operated trimmer.

Figure 2 is a side elevation of the trimmer and attachment viewed from the rear.

Figure 3 is a sectional view of the trimmer and attachment taken on the line 3—3 of Figure 1.

Figure 4 is a rear elevation of the trimmer in folded form with some of the parts shown in unfolded position by dotted lines.

Figure 5 is an enlarged fragmentary plan view of a set of members employed for connecting the attachment to the housing.

Figure 6 is a fragmentary sectional view taken on the line 6—6 of Figure 1, showing a set of members for connecting the attachment to the cutter bar of the trimmer.

In the drawings, the attachment is shown designed for use with a portable electric hedge-trimmer 7 comprising a cutter-bar 8 upon which is slidably supported and held a cutter knife 9, the latter being connected for reciprocative movement on the bar and driven through the agency of a motor 12. The cutter-bar 8 extends from an extension 13 of the housing 14 of the motor parallel to the motor axis, and is provided with fingers 16 at its forward edge which cooperate with teeth 17 of the knife in effecting the cutting operation. As here shown, the knife is held between plates 18 and 19 of the bar which are secured together by means of screws 21 and 22, the latter serving to guide the knife during its reciprocative movement. On or more handles 23 are provided on the motor housing to enable the operator to grip and carry the trimmer during the use of the device. Access to the housing is afforded by removal of an end wall 24 which is located at the side adjacent the bar and knife and is held in place by screws 26.

As will be clear from Figures 1 and 3, the attachment of my invention comprises in part a plate or tray 27 which is approximately of the same length as the cutter-bar and is designed to fit upon the latter with the ends of the two coterminus. As will be seen by reference particularly to Figure 3, the main body portion of the tray extends rearwardly from the cutter-bar in approximate coplanar relation thereto, while the front portion of the body overlies the bar and terminates somewhat inwardly of the exposed portion of the knife. Desirably, the tray is formed of screen or a perforated material, so that notwithstanding the use of the attachment, the operator may have a relatively clear view through the tray.

The tray is preferably of rectangular form and is arranged to be secured to the trimmer by attachment both to the cutter-bar and the motor housing or extension and in order to provide for greater rigidity for the connection of the tray to the trimmer, and at the same time provide effective reenforcement for the relatively light tray material, without adding an undue weight to the tray, the connecting means and the reenforcement are combined. In the present embodiment, the tray is arranged to be connected to the trimmer at three points, to-wit: two points with the housing and one point with the cutter-bar. The connection to the cutter-bar is designed to be effected through the means of a connecting member 28 which comprises a rod 29 which extends along the underside of the tray for the portion of the latter which extends rearwardly from the cutter-bar. The rod is rigidly secured to the tray and extends through the tray and over the same at the portion which is designed to overlie the bar. The rod 29 it will be understood is located adjacent the outer end 31 of the tray and has provided at its forward end a socket 32 which is designed to engage on a stud 33, here shown formed as an extension of one of the screws 22 on the cutter-bar. The socket and stud when engaged are frictionally held against disengagement by means of a spring 34 designed to seat in a groove 36 on the stud. It is important to note that the axis of the stud is perpendicular to the cutter-bar and that the socket is positioned at right angles to the rod so that when the said parts are engaged they cannot be detached except upon a relative displacement perpendicular to the face of the cutter-bar. Along the end 36 of the tray arranged to lie adjacent the trimmer housing, there is provided a second rod 37 which is fixedly secured thereto in overlying relation and is provided with a socket 38 similar to the socket 32. The socket 38 is arranged to engage a grooved stud which is formed as a part of one of the screws 26. The axis of the stud which cooperates with socket 38 is parallel to the axis of the bar, and the socket 38 is inclined to the rod 37 so as to engage over the cooperating stud. It is to be noted that with this arrangement socket and stud cannot become disengaged unless one is moved relative to the other in a direction longitudinally of the cutter-bar. Extending substantially for the full length of the tray, that is from practically one end to the other, is a rod 41 which is preferably positioned on and secured to the underside of the tray by means of a coil 42. The coil serves to hingedly secure the rod 41 to the tray and is provided at the inner end of the tray with an angular extension 43 which extends to the upper side of the tray through a slot 44 in the tray. The outer end of the extension 43 is provided with a socket 46 which is arranged similar to the socket 38 and is designed to engage a stud 47 formed on another of the screws 26. By reason of the hinged connection of the rod extension, the attachment or detachment of the socket 46 and stud 47 may be readily effected while the two other sets of connections are in engaged relation, thus affording the ready attachment or detachment of the tray to the trimmer, while assuring a very secure three-point connection when the catcher is in operative position. It is important to note that with each set of the connecting members aforesaid, disconnection of the cooperating sections can only be effected by displacement of one with respect to the cooperating section in a direction transverse to a line parallel to the plane of the tray, and a normal to the longitudinal axis of the bar. In operating the trimmer with the tray attached thereto, the strain is normally such as to pull the tray rearwardly from the cutter-bar, and since detachment is prevented by any pull by the tray in such direction, detachment would be effectively prevented.

Preferably, a wall or guard 48 is hingedly connected to the tray along the rear edge thereof, and such guard may be held in perpendicular position by means of an arm 49 which is pivotally secured to the underside of the tray by means of a coil 51, the guard being provided with a spring hook 52 or the like which is designed to engage the arm in order to retain the guard in the extended position. If desired, an end wall or guard 53 may be similarly positioned along the outer end of the tray, the guard 53 being held in angular position by means of a spring hook 54 pivotally secured to an adjacent end of the tray. The guards are desired to more effectively catch the trimmings on the tray. However, where the operator prefers to use the tray practically flat or where the catcher is removed and it is to be stored, the guards may be readily folded downward to lie upon the tray member 27 and held in such position by means of the hook 54 aforesaid. Furthermore, when the guards are in folded position, the tray may be more effectively passed through ordinarily inaccessible places. The foldable tray portions are also formed of screen or perforated material.

In using the trimmer with the catcher attached thereto, the operator grasps the trimmer handles in the usual manner and proceeds to cut the hedge, shrubbery or the like, in practically the same way as where the trimmer is used without the catcher. It will be clear that as the trimmer is advanced over the top of the shrubbery and cuts portions of the same, the cut portions will fall upon the catcher and thereby prevent the cuttings from falling upon and into the foliage. This catching or trapping of the cuttings, therefore, eliminates the necessity for raking out the cuttings from the foliage or otherwise disturbing the smooth cut surface by the subsequent extraction of the cuttings. In this manner, as can be readily perceived, a great saving of time will be afforded in cutting shrubbery with a trimmer such as the type designed. In fact by using my device therewith, the time required for trimming a hedge is ordinarily reduced one-half.

I claim:

1. A catcher attachment for a hand supported power-driven hedge-trimmer having a housing and a cutter-bar extending from an end portion thereof with a cutter-blade mounted thereon, comprising a plate extending rearwardly from said bar in substantially coplanar relation to the coacting faces of the bar and blade, and means adjacent the forward edge of the plate to releasably secure the plate to said bar, and means extending from said plate intermediate the forward and rear edges thereof for releasably securing the plate to said end portion of said housing above said bar extending therefrom.

2. A catcher attachment for a power-driven hedge-trimmer having a housing and a cutter-bar extending from said housing, comprising a catcher plate coextensive with said bar and arranged to extend from the rear edge thereof, means to removably secure said plate to said housing and bar, and a guard secured to said plate positionable to lie folded against said plate or unfolded to provide a guard adjacent the rear edge of said plate.

3. A catcher attachment for a power-driven hedge-trimmer having a cutter-bar, comprising a plate formed of wire mesh and having one edge thereof of substantially the same length as said bar, reenforcing means for said plate, means secured to said reenforcing means for releasably connecting said plate to said bar with said plate edge supported along said bar, a guard member hingedly connected to the rear edge of said plate and foldable into substantially coplanar relation with said plate, and means to retain said guard in folded angular relation to said plate.

4. In a catcher attachment for a power-driven hedge-trimmer having a housing and a cutter-bar extending therefrom, said bar and housing having exposed securing members extending therefrom adjacent the opposite ends of said bar, a catcher plate for cuttings arranged for positioning along said bar with the forward edge of said plate overlying the bar, means at the ends of said plate for releasably attaching said plate to certain of said securing members, and an arm pivotally connected to said plate adjacent the rear edge thereof attachable to another of said securing members.

5. A catcher attachment for a power-driven hedge-trimmer having a cutter-bar, comprising a flat plate for cuttings arranged to extend rearwardly from said bar, guard members hingedly secured to said plate and adapted to be positioned upright adjacent the rear and side edges of the plate or folded flat upon the plate, and means at the forward edge of said plate for releasably securing the plate in position on said bar.

6. A catcher attachment for a power-driven hedge-trimmer having a housing and a cutter-bar extending therefrom comprising, a tray for trimmings, and means for supporting said tray from said housing and cutter-bar in substantially coplanar rearwardly extending relation to said cutter-bar and including quick detachable fastening members secured in part to said housing and cutter-bar, said members being attachable and detachable in directions perpendicular to the length of said cutter-bar at the cutter-bar and longitudinally of the cutter-bar at said housing.

7. A catcher attachment for a hand supported power-driven hedge trimmer having a housing and a cutter bar extending therefrom with a cutter blade coacting with the forward edge thereof, comprising, a tray, supporting means connecting said tray to said bar with one edge of said tray extending along and resting upon said bar with the remainder of said tray extending rearwardly from said bar, and a second supporting means attached to a rear portion of said tray and attached to said housing and functioning to hold the tray in substantially coplanar position with said cutter-bar.

8. A catcher attachment for a power-driven hedge trimmer having a housing and a cutter bar extending from said housing, a catcher plate having one edge thereof of substantially the same length as said bar, supporting means carried by said plate and detachably connected to said bar adjacent the outer end thereof for positioning said plate edge along and upon said bar in substantially coterminus relationship therewith, another supporting means secured to said plate adjacent the opposite edge thereof and detachably secured to said housing for holding said plate in substantially coplanar relation to said cutter bar, and a guard secured to and extending across said plate adjacent said last named edge thereof.

9. A catcher attachment for a power-driven hedge trimmer having a housing and a cutter bar extending therefrom, comprising, a wire mesh tray having one edge thereof substantially co-extensive in length with said bar, a plurality of rods secured to said plate, means detachably securing one of said rods to said cutter bar for positioning said tray edge along and upon said bar, and means detachably securing another of said rods to said housing for supporting the remainder of said tray in substantially coplanar relation to said cutter bar.

ALFRED M. WRIGHT.